(12) United States Patent
Yamane et al.

(10) Patent No.: US 9,862,294 B2
(45) Date of Patent: Jan. 9, 2018

(54) HEAD REST OF AN UPWARD SWING ADJUSTMENT TYPE

(71) Applicant: BIZEN HATSUJO CO., LTD., Okayama (JP)

(72) Inventors: Takeshi Yamane, Okayama (JP);
Tokuzo Kobayashi, Okayama (JP);
Yasushi Taniguchi, Okayama (JP)

(73) Assignee: BIZEN HATSUJO CO., LTD., Okayama (JP)

( * ) Notice: Subject to any disclaimer, the term of this patent is extended or adjusted under 35 U.S.C. 154(b) by 0 days.

(21) Appl. No.: 15/383,242

(22) Filed: Dec. 19, 2016

(65) Prior Publication Data

US 2017/0182916 A1  Jun. 29, 2017

(30) Foreign Application Priority Data

Dec. 24, 2015  (JP) .................. 2015-252637

(51) Int. Cl.
*B60N 2/48* (2006.01)

(52) U.S. Cl.
CPC ......... *B60N 2/4855* (2013.01); *B60N 2/4841* (2013.01); *B60N 2/4844* (2013.01); *B60N 2/4847* (2013.01)

(58) Field of Classification Search
CPC .. B60N 2/4855; B60N 2/4841; B60N 2/4847; B60N 2/4844
USPC ........................................... 297/408
See application file for complete search history.

(56) References Cited

U.S. PATENT DOCUMENTS

| | | | | |
|---|---|---|---|---|
| 8,342,606 B2* | 1/2013 | Le Texier | ................ | B60N 2/24 297/408 |
| 8,672,410 B2* | 3/2014 | Misawa | ............... | B60N 2/4808 297/403 |
| 2007/0013219 A1 | 1/2007 | Chung | | |
| 2008/0277989 A1* | 11/2008 | Yamane | ................... | B60N 2/43 297/408 |
| 2016/0046217 A1* | 2/2016 | Wagner | ............... | B60N 2/4841 297/408 |

FOREIGN PATENT DOCUMENTS

| | | |
|---|---|---|
| JP | 2006-523497 A | 10/2006 |
| JP | 5513693 B1 | 4/2014 |
| JP | 5710831 B1 | 3/2015 |

* cited by examiner

*Primary Examiner* — Milton Nelson, Jr.
(74) *Attorney, Agent, or Firm* — Pearne & Gordon LLP

(57) ABSTRACT

A head rest that can secure backward view when it is not used, and enable adjustment of its front-and-rear position in use. The head rest is rotatable from a rearmost position to a stored position in which the head rest is tilted down forward. When the head rest is in a use range from the rearmost position to a forward adjustment limit position located in front, the tilting angle of the head rest is adjustable, and the head rest can be rotated forward to the stored position and rotated backward to the rearmost position. By contrast, when the head rest is in the stored position, forward rotation and backward rotation of the head rest are regulated, and the head rest can be rotated backward to the rearmost position.

2 Claims, 19 Drawing Sheets

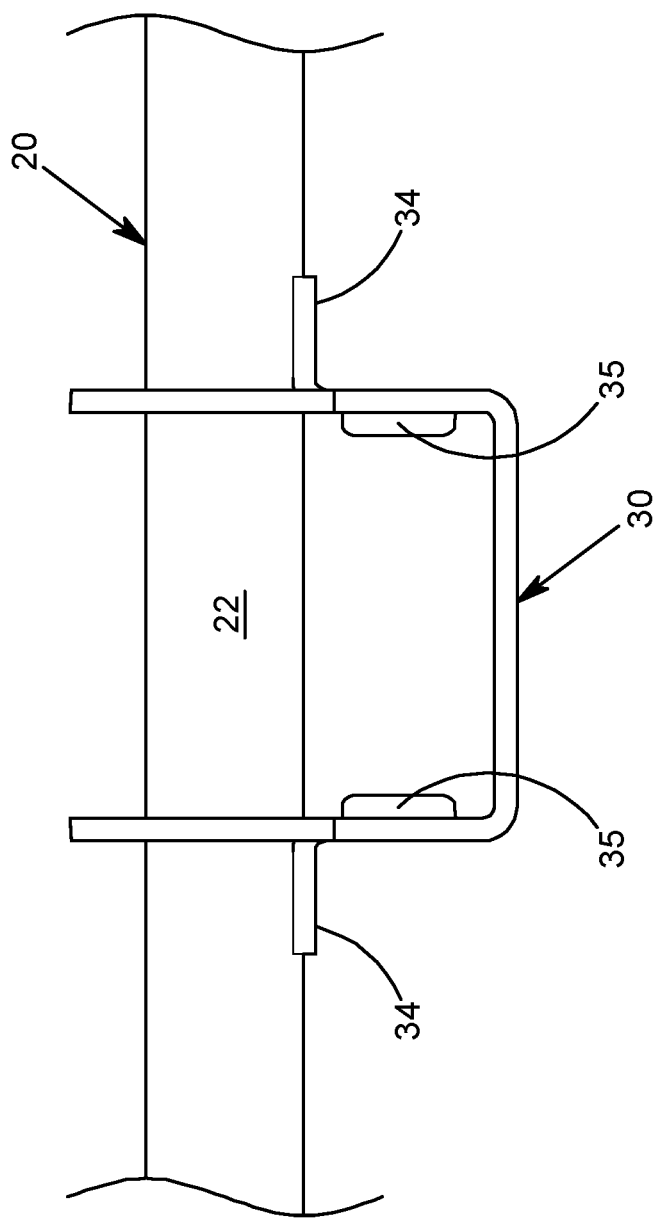

HEAD REST OF AN UPWARD SWING ADJUSTMENT TYPE

TECHNICAL FIELD

The present disclosure relates to a headrest provided on an upper portion of a seat back of an automobile or the like.

BACKGROUND

As a headrest provided on an upper portion of a seat back of an automobile or the like, various head rests have been presented, such as a headrest enabling only adjustment of height without changing the front-and-rear position (hereinafter also referred to as "fixed head rest").

For example, JP 5513693 B presents a head rest (hereinafter also referred to as "folding type head rest") capable of being tilted (folded) forward with respect to the seat back when the head rest is not used. The folding type head rest is folded when the head rest is not used, to secure a wide backward view of the driver or the like, and prevents improper use of the head rest by causing the folded head rest to widely project from the front surface side of the seat back.

As a head rest, a head rest (hereinafter also referred to as "back-and-forth adjustable type head rest") enabling adjustment of its front-and-rear position in its use has been presented. For example, JP 2006-523497 A presents a back-and-forth adjustable type head rest (hereinafter also referred to as "parallel link type head rest") adopting a parallel link mechanism. In addition, JP 5710831 B presents a back-and-forth adjustable type head rest (hereinafter also referred to as "upward swing type head rest") that is rotatably attached to the upper portion of a head rest stay, to enable adjustment of its front-and-rear position in its use, without adopting a parallel link mechanism. The back-and-forth adjustable type head rest enables adjustment of the front-and-rear position of the head rest in accordance with the posture of the seated person or the like, and enables proper adjustment of the space between the back of the head of the seated person and the front surface of the head rest.

By contrast, the fixed type head rest has disadvantages that the backward view of the driver or the like is not secured when the head rest is not used, and the front-and-rear position thereof cannot be adjusted in its use. The folding type head rest described above has a disadvantage that the front-and-rear position thereof cannot be adjusted in its use. The back-and-forth adjustable type head rest described above has a disadvantage that the backward view of the driver or the like is not secured in its use. The back-and-forth adjustable type head rest described above is switched between a locked state and an unlocked state with a riding past spring, and may malfunction. In addition, the back-and-forth adjustable type head rest requires special press such as fine blanking, when members forming the head rest are processed, and has a disadvantage of increasing manufacturing cost.

RELATED ART LITERATURES

Summary

The present disclosure has been made to solve the above problem, and provides a head rest that is tilted forward to be substantially horizontal when the head rest is not used, to secure a backward view of the driver or the like, and enables adjustment of a front-and-rear position (tilting angle) thereof to an optimum place when the head rest is used. Another object of the present disclosure is to provide a head rest with excellent safety, reduce the cost by processing the constituent members of the head rest by ordinary press, and reduce the weight thereof by thinning the constituent members of the head rest.

The above problem is solved by providing a head rest of an upward swing adjustment type supported by a head rest stay in a state of being rotatable from a rearmost position to a stored position, the head rest being in rising state at the rearmost position, the head rest being tilted forward by approximately 70° to 90° at the stored position, wherein if the head rest is in a use range, the use range is between the rear most position and a forward adjustment limit position, the head rest tilting forward by approximately 40° from the rearmost position to reach the forward adjustment limit position; a tilting angle of the head rest is adjustable by in-use tilting-angle adjustment means, and the head rest is enabled to be rotated forward to the stored position and rotated backward to the rearmost position by unlock means; and if the head rest is in the stored position; the head rest in the stored position is enabled to be rotated backward to the rearmost position by the unlock means, while backward rotation of the head rest is regulated by an in-storage backward rotation regulating means.

The head rest according to the present disclosure not only is folded in the forward stored position when the head rest is not used, to secure a backward view of the driver or the like, but also enables adjustment of the front-and-rear position of the head rest when the head rest is used to reduce damage to the head and the neck of the seated person.

A specific structure of the head rest of the present disclosure is not particularly limited, but for example, the head rest may include: a unit including a fixing member to be fixed to a head rest stay, a rotating member pin-coupled with the fixing member, a rotating member urging spring continuously urging the rotating member in a direction returning to a rearmost position, a lock plate pin-coupled with the rotating member, and a lock urging spring continuously urging the lock plate in a regulating direction; a mechanical member in which the unit and the head rest stay are coupled; a case enveloping the mechanical member; an operation member incorporated in the case; and a cushion material and a cover covering the case, wherein an in-use first locking portion provided in an external circumferential portion of the fixing member and an in-use first locked portion provided in the lock plate function as the in-use tilting-angle adjustment means, a second locking portion provided in the external circumferential portion of the fixing member and a second locked portion provided in the lock plate function as an in-use forward rotation regulating member, and a first cam provided in the operation member and a first cam contact portion provided in the lock plate, or a second cam provided in a lock regulating member pin-coupled with the fixing member and a second cam contact portion provided in the lock plate function as the unlock means. The head rest having this structure is also referred to as "head rest regulating forward rotation in use" hereinafter.

This structure includes both features of the folding type and the back-and-forth adjustable type, and prevents forward rotation in the forward adjustment limit position with the in-use forward rotation regulating means, preventing movement of the head rest to a forward stored position beyond the use range, even when inertial force is applied forward to the head rest, in abrupt deceleration or abnormal stop due to collision. Even when the head of the seated person is moved backward by the reaction of pitching forward by inertial force due to abnormal stop or the like, this structure not only prevents the head from colliding with the distal end portion of the head rest (head rest in the forward stored position) projecting forward, but also enables support of the head in the forward adjustment limit position, and enhances safety of the head rest. In this state, even when the height (height of the case) of the head rest is increased, the head rest in use does not project forward (the distal end portion of the head rest does not bump against the head or the back of the seated person) in abnormal stop or the like. This structure allows the implementation of a tall head rest, a head rest with an edged distal end, or other designs, and thus enables increase in degree of freedom of the design of the head rest. In addition, the head rest regulating forward rotation in use prevents malfunction, because the operation of switching the lock plate (switching of locking of the first locking portion with the first locked portion) is performed without a riding past spring. Besides, because the constituent members such as the lock plate can be processed by ordinary press of a thin steel plate with a thickness of substantially 2 mm (processing by special press such as fine blanking is not required), the head rest enables reduction in cost and weight.

The head rest of the present disclosure may include: a unit including a fixing member to be fixed to a head rest stay, a rotating member pin-coupled with the fixing member, a rotating member urging spring continuously urging the rotating member in a direction returning to a rearmost position, a lock plate pin-coupled with the rotating member, a lock urging member continuously urging the lock plate in a regulating direction, and a lock regulating member pin-coupled with the fixing member; a mechanical member in which the unit and the head rest stay are coupled; a case enveloping the mechanical member; and a cushion material and a cover covering the case, wherein an in-use first locking portion provided in an external circumferential portion of the fixing member and an in-use first locked portion provided in the lock plate function as the in-use tilting-angle adjustment member, and a second cam provided in the lock regulating member and a second cam contact portion provided in the lock plate are function as the unlock means. The head rest of this structure is also referred to as "head rest not regulating forward rotation in use" hereinafter.

This structure enables forward rotation of the head rest to the stored position, and backward rotation of the head rest to the rearmost position, without operation of operation means, while it includes features of both the folding type and the back-and-forth adjustable type. However, the head rest not regulating forward rotation in use includes no in-use forward rotation regulating means unlike the head rest regulating forward rotation in use. For this reason, the head rest not regulating forward rotation in use may include the rotating member urging spring with a large urging force, to prevent the head rest from falling down forward due to inertial force acting forward caused by abrupt deceleration or abnormal stop due to collision. In addition, the height (height of the case) of the head rest is preferably not set very high, and the distal end portion of the head rest preferably has a round shape. The head rest not regulating forward rotation in use also prevents malfunction and reduces cost and weight, in the same manner as the head rest regulating forward rotation in use.

BRIEF DESCRIPTION OF THE DRAWINGS

FIG. 5 is a top view of a horizontal stay portion that is coupled by welding with a fixing member;

DETAILED DESCRIPTION OF THE EMBODIMENTS

Embodiments of the head rest of the present disclosure will be explained more specifically hereinafter with reference to drawings. The following is explanation of the head rest of the present disclosure with three embodiments from the first embodiment to the third embodiment as examples, but the technical scope of the present disclosure is not limited to these embodiments, but may be properly modified. In addition, a structure described in one embodiment may be adopted in the other embodiments, as long as the structure cannot be adopted in the other embodiments.

1. Head Rest of First Embodiment

Figure 1:
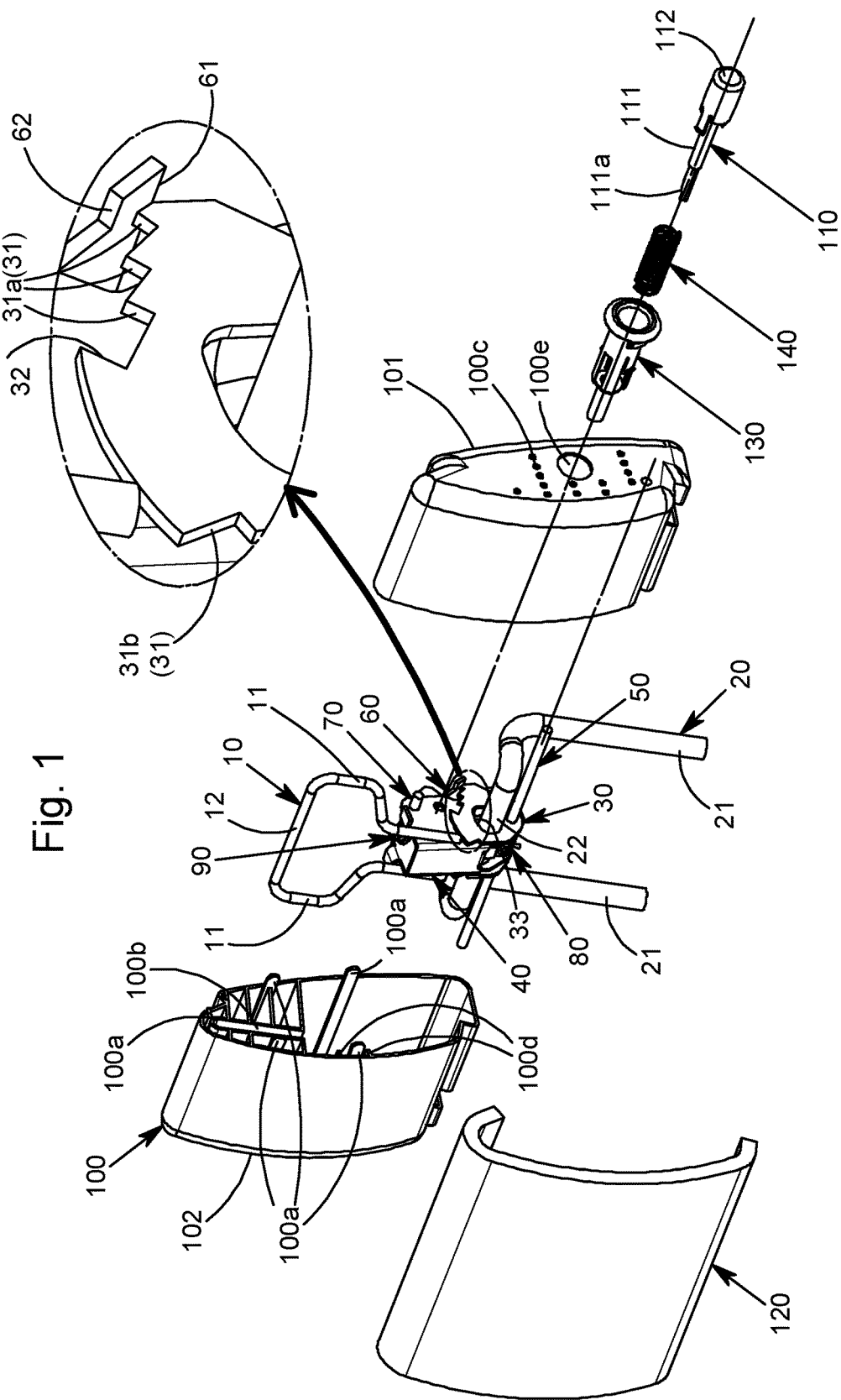
FIG. 1 is an exploded perspective view illustrating a head rest according to a first embodiment.
Figure 2A:
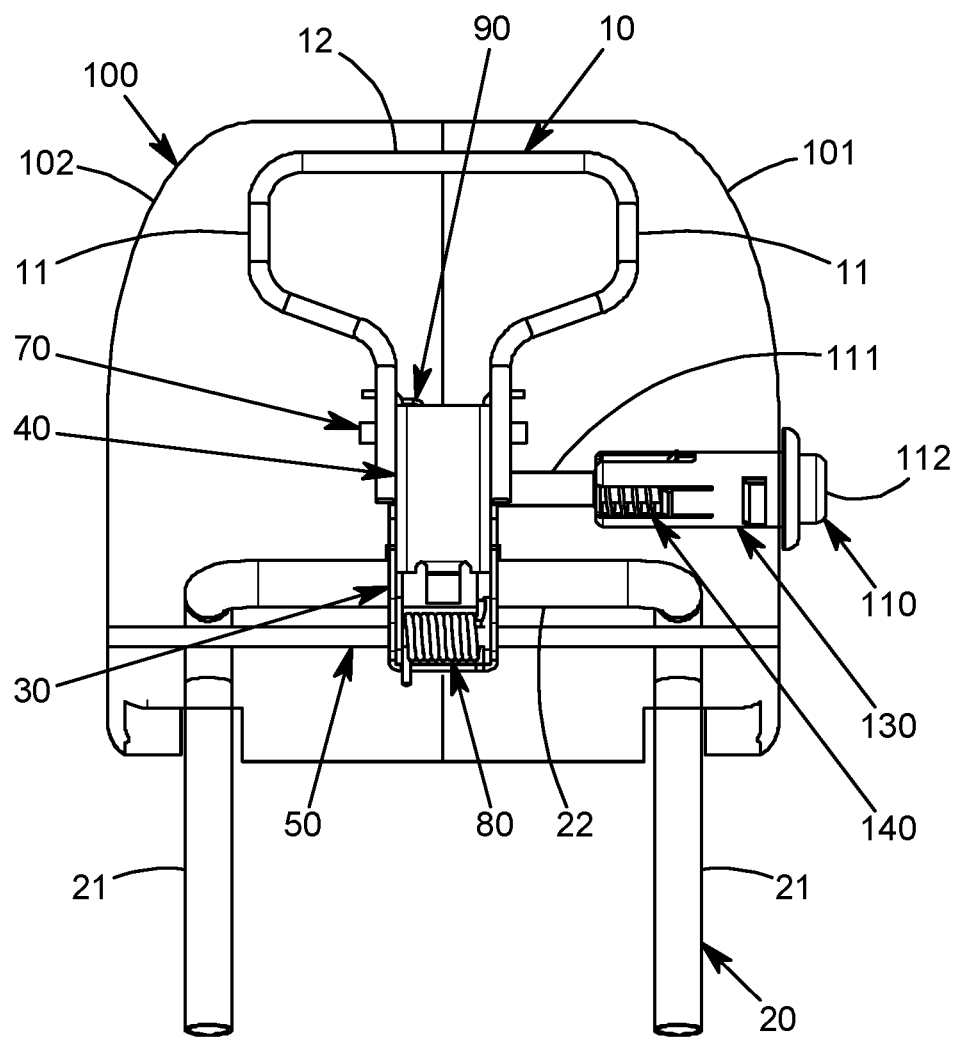
FIGS. 2A and 2B include diagrams illustrating a front view (FIG. 2A) and a side view of the head rest of the first embodiment (FIG. 2B)
Figure 2B:
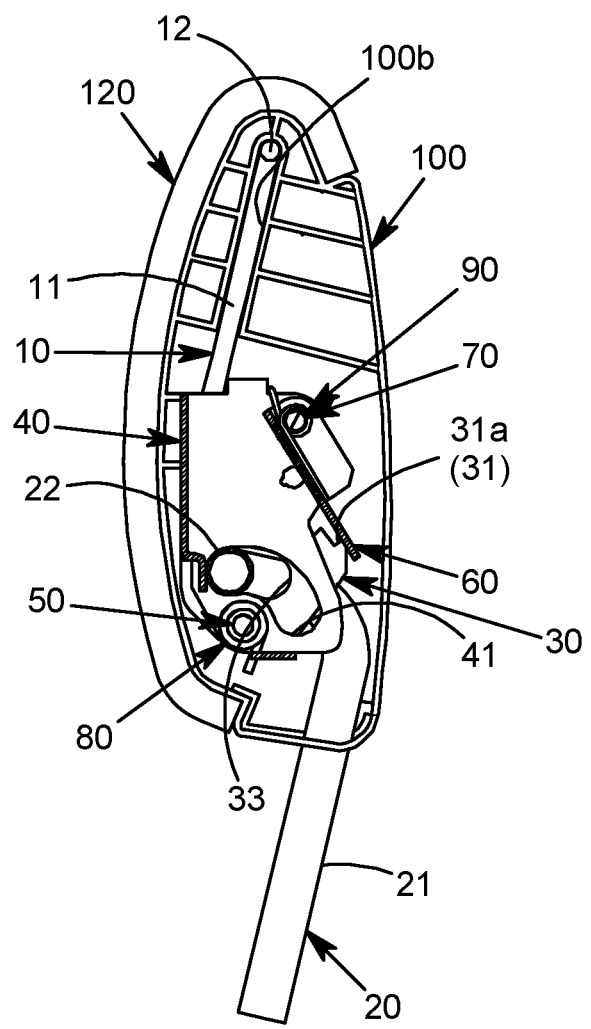
Figure 3A:
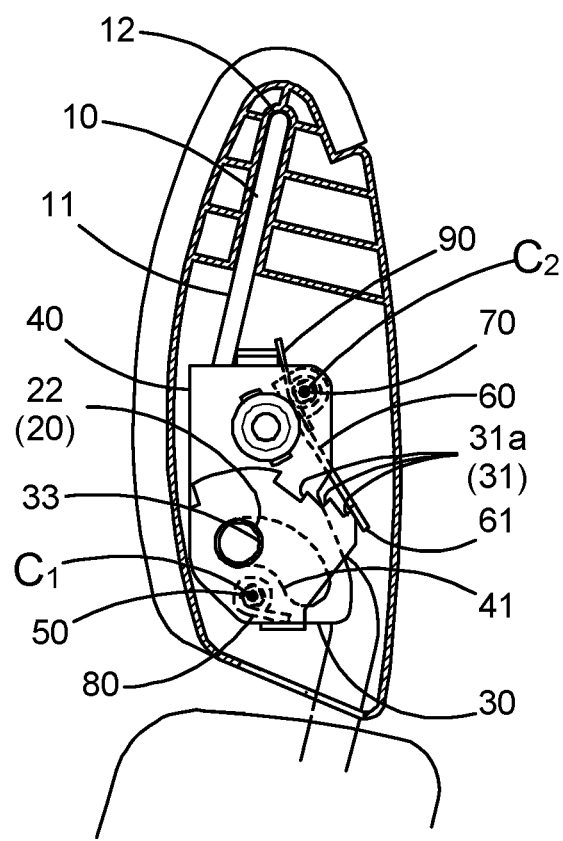
FIGS. 3A-3C include diagrams illustrating side views of a state in which the head rest according to the first embodiment is rotated from a rearmost position (FIG. 3A) to a stored position (FIG. 3C) through a forward adjustment limit position (FIG. 3B)
Figure 3B:
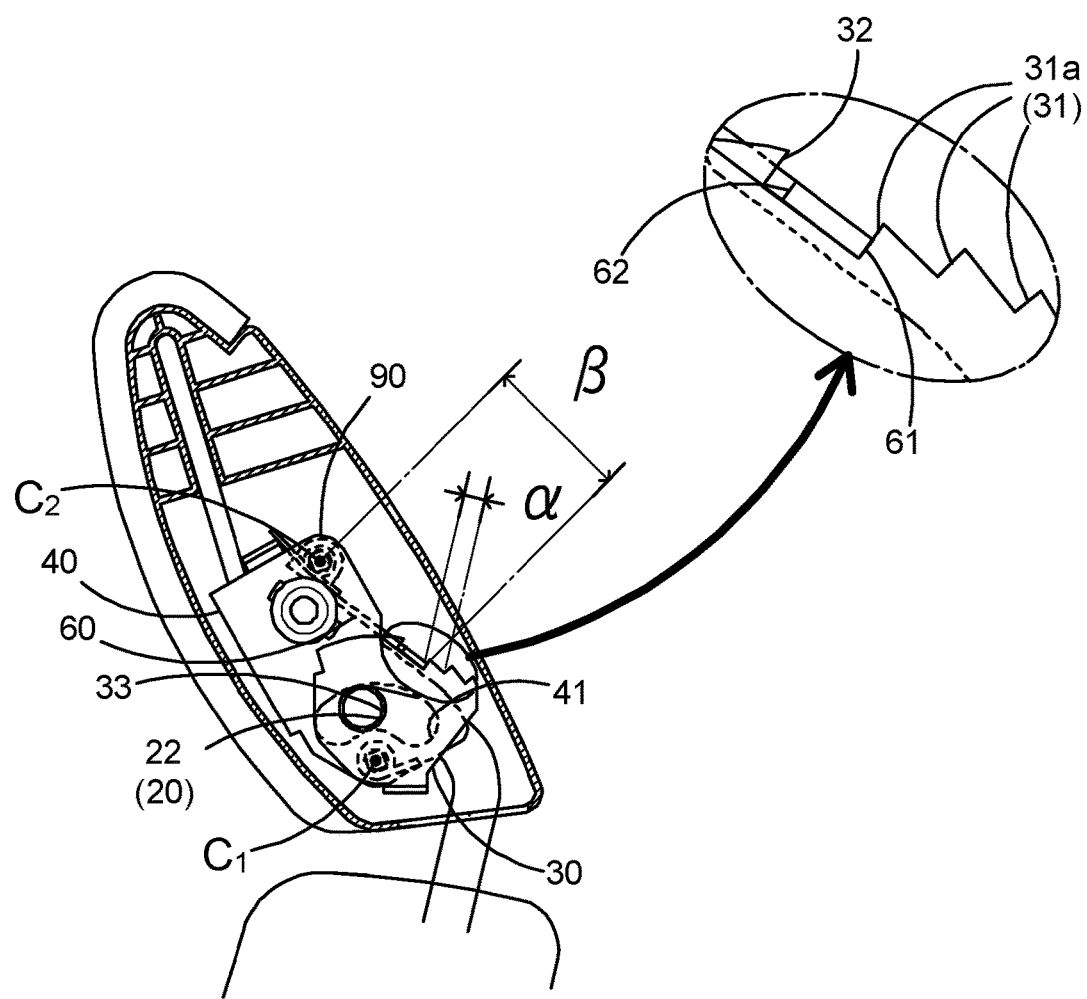
Figure 3C:
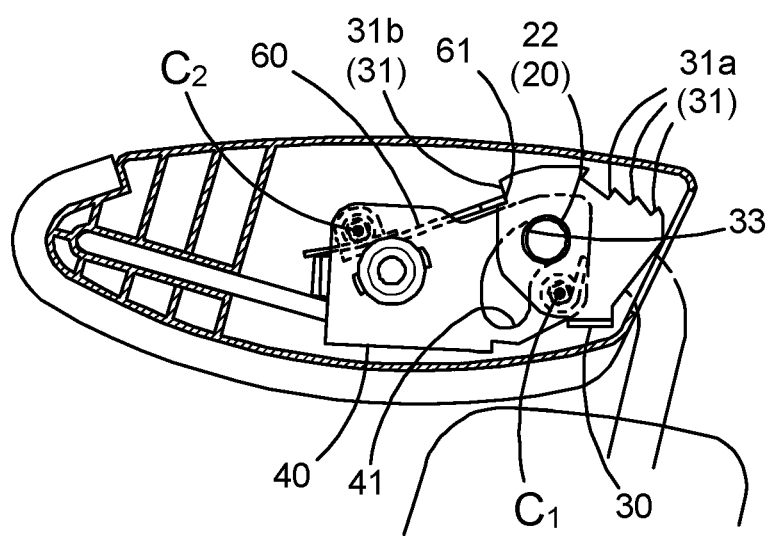
Figure 4A:
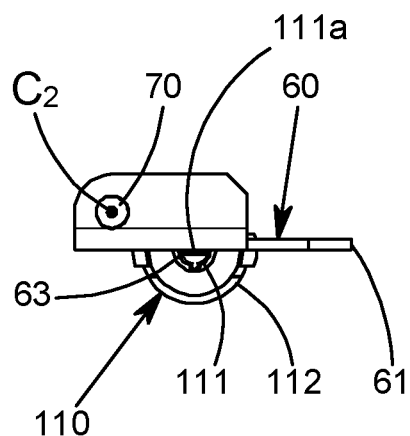
FIGS. 4A-4D include diagrams illustrating change in positional relation between a first cam and a first cam contact portion (FIGS. 4A to 4D)
Figure 4B:
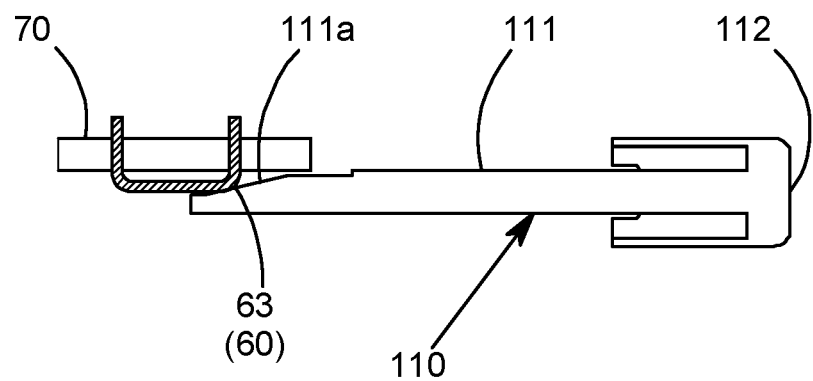
Figure 4C:
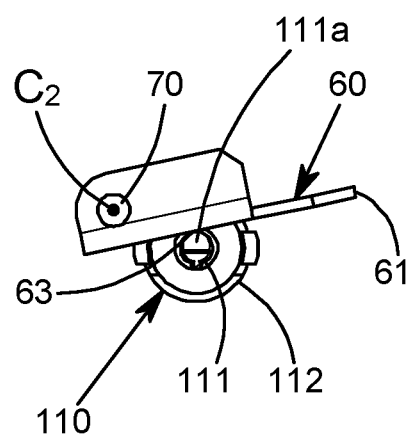
Figure 4D:
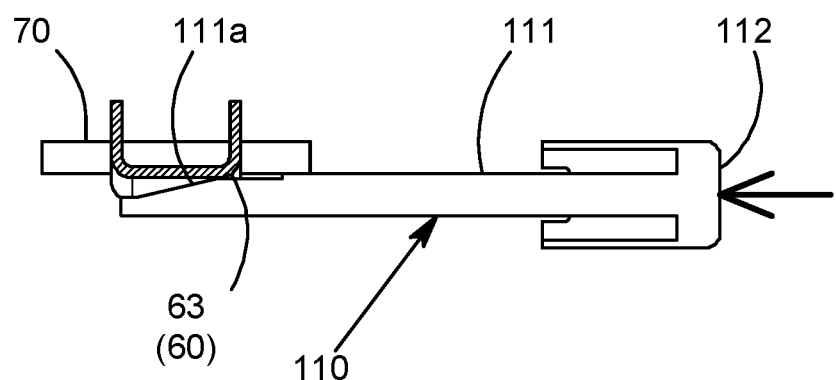

First, a head rest of the first embodiment will be explained hereinafter. FIG. 1 is an exploded perspective view illustrating the head rest according to the first embodiment. FIGS. 2A and 2B include diagrams illustrating a front view (FIG. 2A) and a side view (FIG. 2B) of the head rest according to the first embodiment. FIGS. 3A-3C include diagrams illustrating side views of a state in which the head rest according to the first embodiment is rotated from a rearmost position (FIG. 3A) to a stored position (FIG. 3C) through a forward adjustment limit position (FIG. 3B). In FIGS. 2A-3C, drawings are provided to show the inner structure of the head rest, for convenience' sake of illustration. FIGS. 4A-4D include diagrams illustrating change in positional relation between a first cam 111a and a first cam contact portion 63. FIG. 4A and FIG. 4C illustrate side views (viewed from a direction parallel to a longitudinal direction of a bar-shaped portion 111 of the operation means 110), and FIG. 4B and FIG. 4D illustrate front views thereof. FIG. 5 is a top view of a horizontal stay portion 22 that is coupled by welding with a fixing member 30.

The head rest according to the first embodiment is a head rest of an upward swing adjustment type that is supported by a head rest stay 20 in a state where the head rest is rotatable from a rearmost position (FIG. 3A in which the head rest stands to a stored position (FIG. 3C) in which the head rest is tilted forward by approximately 70° to 90°. When the head rest according to the first embodiment exists in a use range, that is, when the head rest exists in a range from the rearmost position illustrated in FIG. 3A to the forward adjustment limit position in which the head rest is tilted by approximately 40° as illustrated in FIG. 3B, the head rest is in a state in which the tilting angle of the head rest is adjustable by in-use tilting-angle adjustment means described later, and forward rotation of the head rest exceeding the use range of the head rest is regulated by in-use forward rotation regulating means described later. When the head rest is in the use range, the head rest can be rotated forward to the stored position and rotated backward to the rearmost position by unlock means described later. By contrast, when the head rest is in the stored position, that is, when the head rest is in the position illustrated in FIG. 3C, forward rotation and backward rotation of the head rest are regulated by storage backward rotation regulating means described later. In addition, when the head rest is in the stored position, the head rest can be rotated backward to the rearmost position by unlock means described later. The head rest according to the first embodiment is of an upward swing adjustment type including features of both the folding type and the back-and-forth adjustable type. The head rest according to the first embodiment includes in-use forward rotation regulating means, and corresponds to the "head rest regulating forward rotation in use" described above.

The following is explanation of a specific configuration of the head rest according to the first embodiment. As illustrated in FIG. 1, the head rest according to the first embodiment includes a fixing member 30, a rotating member 40, a first coupling pin 50, a lock plate 60, a second coupling pin 70, a rotating member urging spring 80, a lock urging spring 90, a case 100, operation means 110, and a cushion sheet 120, and is formed of these constituent components 10 to 120 serving as a unit.

1.1 Head Rest Frame and Head Rest Stay

A head rest frame 10 has a structure in which upper ends of a pair of left and right vertical frame portions 11 are connected with a connecting portion 12 extending in the lateral direction, the vertical frame portions 11 being formed by bending a steel wire with an external diameter of 6 mm. Lower portions of the vertical frame portions 11 in the head rest frame 10 are coupled by welding with the rotating member 40. A head rest stay 20 has a structure in which upper ends of a pair of left and right vertical stay portions 21, each of which is formed by bending a steel wire in an inverted U shape in front view, are connected with a horizontal stay portion 22.

1.2 Fixing Member

The fixing member 30 is a U-shaped member including a pair of left and right side wall portions and including an external edge portion provided with a first locking portion 31 and a second locking portion 32, and is provided with first stay inserting holes 33 in the side wall portions. Each of the first stay inserting hole 33 is formed in an elongated hole shape, to enable insertion of the horizontal stay portion 22. Each first stay inserting hole 33 may have any shape through which the horizontal stay portion 22 can be inserted, and may have a notch shape. In FIGS. 3A-3C, FIGS. 6A-6D, and FIGS. 7A-7D, the first stay inserting hole 33 is illustrated as a round hole with substantially the same shape as the section of the horizontal stay portion 22, for convenience' sake of illustration.

The first locking portion 31 serves as a portion to lock a first locked portion 61 in the lock plate 60 described later. In the head rest according to the first embodiment, each of the side walls is provided with a plurality of first locking portions 31. Specifically, each of the side walls is provided with a plurality of (more specifically, three) in-use first locking portions 31a and one storage first locking portion 31b. The in-use first locking portions 31a serve as portions to lock the first locked portion 61, when the head rest is in the use range (for example, see FIG. 3B). For this reason, in the head rest according to the first embodiment, the head rest is rotated forward from the rearmost position illustrated in FIG. 3A, and the in-use first locking portion 31a to lock the first locked portion 61 is shifted forward one by one, to adjust the front-and-rear position of the head rest in the use range step-by-step. In other words, the in-use first locking portions 31a serve as portions that function as the in-use tilting-angle adjustment means together with the first locked portion 61. By contrast, the storage first locking portion 31b serves a portion to lock the first locked portion 61 when the head rest is in the stored position (see FIG. 3C), and regulates backward rotation of the head rest. In other words, the storage first locking portion 31b serves as a portion that functions as the storage backward rotation regulating means together with the first locked portion 61.

The second locking portion 32 serves as a portion to lock a second locked portion 62 in the lock plate 60 described later. The second locking portion 32 is provided on more front side than the forefront first locking portion 31a, and in a direction opposite to (to face the rear) the first locking portions 31a. For this reason, even when the head rest is going to rotate forward beyond the forward adjustment limit position, the second locked portion 62 is locked with the second locking portion 32, and the head rest cannot be rotated forward any more, unless the operation means 110 described later is operated. Specifically, the second locking portion 32 serves as a portion that functions as the in-use forward rotation regulating means together with the second locked portion 62.

Each of the first stay inserting holes 33 serves as a portion to couple and weld the horizontal stay portion 22 of the head rest stay 20 inserted therethrough. In the head rest according to the first embodiment, as illustrated in FIG. 5, a welding portion 34 is cut and raised from each of the left and right side wall portions in the fixing member 30, and the welding portions 34 are welded on the external circumferential portion of the horizontal stay portion 22. A spacer projection 35 is provided inside each of the side wall portions in the fixing member 30, to form a space between the internal surface of each side wall portion of the fixing member 30 and an external surface of each side wall portion of the rotating member 40 disposed inside the fixing member 30. This is because there is the fear adverse influence occurs, such as vaporization of grease applied between the fixing member 30 and the rotating member 40, due to transmission of heat in welding the welding portions 34 to the horizontal stay portion 22 to the rotating member 40, if the side wall portions of the fixing member 30 contact the side wall portions of the rotating member 40. The rotating member 40 is disposed inside the fixing member 30 when the welding portions 34 are welded to the horizontal stay portion 22.

In the head rest according to the first embodiment, a distance β (see FIG. 3B) from a rotation center C2 of the lock plate 60 to the first locked portion 61 is set at least six times as large as a pitch a of the in-use first locking portions 31a, to reduce the swing angle of the lock plate 60 at the time when the head rest in the use range is rotated forward. In addition, in the head rest according to the first embodiment, the lock plate 60 is continuously urged in a lock direction, with a lock urging spring 90 described later. This structure prevents the first locked portion 61 from being detached from the in-use first locking portion 31a, even when an impact or the like is applied to the head rest. The swing angle in the lock plate 60 is preferably set to 15° or less, more preferably set to 10° or less.

1.3 Rotating Member and First Coupling Pin

The rotating member 40 is formed of a U-shaped member including a pair of left and right side wall portions, each of which is provided with a second stay inserting hole 41 (see FIGS. 3A-3C) with an arc long hole shape. The first coupling pin 50 is configured to rotatably couple the rotating member 40 with the fixing member 30. With the structure, the rotating member 40 is in a state of being rotatable with respect to the fixing member 30 about a center line C1 (see FIG. 3A) of the first coupling pin 50 serving as the rotation center. In the head rest according to the first embodiment, the first coupling pin 50 is formed long in the lateral direction, to provide the first coupling pin 50 with a function of coupling a left case 101 with a right case 102 described later.

1.4 Lock Plate and Second Coupling Pin

The lock plate 60 is a plate-like member provided with the first locked portion 61 in the left portion and the right portion in the lower end edge thereof. The first locked portion 61 has a function of being locked with the in-use first locking portions 31a to regulate backward rotation of the rotating member 40 when the head rest is in the use range, and a function of being locked with the storage first locking portion 31b to regulate backward rotation of the rotating member 40 when the head rest is in the stored position. In other words, the first locked portion 61 not only functions as the in-use tilting-angle adjustment means together with the in-use first locking portions 31a, but also functions as the storage backward rotation regulating means together with the storage first locking portion 31b. In the head rest according to the first embodiment, projecting pieces are provided to project to the left and the right from the lower end portion of the lock plate 60, and the lower end surfaces serve as the first locked portions 61. The upper end surface of each projecting piece functions as the second locked portion 62 to be locked with the second locking portion 32 as described above. In other words, the second locked portion 62 functions as the in-use forward rotation regulating means together with the second locking portion 32. The second coupling pin 70 is configured to rotatably couple the lock plate 60 with the rotating member 40. For this reason, the lock plate 60 is in a state of being rotatable with respect to the rotating member 40 about the center line C2 (see FIG. 3A) of the second coupling pin 70 serving as the rotation center.

1.5 Rotating Member Urging Spring and Lock Urging Spring

The rotating member urging spring 80 is configured to continuously urge the rotating member 40 in a direction of returning to its initial position (see FIG. 3A) (a direction of rotating the rotating member 40 clockwise about the center line C1 in FIG. 3A serving as the center). The urging force of the rotating member urging spring 80 sufficiently prevents the head rest from rotating forward even if abrupt stop generates inertial force. The lock urging spring 90 is configured to continuously urge the lock plate 60 in a direction in which the first locked portion 61 is locked with the first locking portion 31 (direction of rotating the lock plate 60 clockwise about the center line C2 in FIG. 3A serving as the center).

1.6 Case

The case 100 is a member to envelope the mechanical member formed of the fixing member 30 and the rotating member 40 and the like. As illustrated in FIG. 1, side surface portions of the case 100 are provided with a plurality of silencing holes 100c, to prevent confinement of noise generated inside the case 100, such as sound of contact between the first locking portion 31 and the first locked portion 61. An internal surface side of a surface layer portion forming the external shape of the case 100 is reinforced with ribs 100d, to achieve excellent strength although it has small thickness and light weight.

In the head rest according to the first embodiment, the case 100 is of a left-and-right division type formed of the left case 101 and the right case 102. A division end (the division end of the right case 102 in the head rest of the first embodiment) of the case 100 is provided with a plurality of small projections 100a. These small projections 100a are brought into close contact with the internal surface of the surface layer portion of the other case (the left case 101 in the head rest of the first embodiment) and held thereon, when the left case 101 and the right case 102 are assembled.

Each of internal upper portions of the left case 101 and the right case 102 is provided with a fitting groove 100b including a pair of front and rear wall portions. The head rest frame 10 is fitted into the fitting grooves 100b, and the front surface and the rear surface of the head rest frame 10 including the connecting portion 12 are brought into close contact with the front and rear wall portions of the fitting grooves 100b. With this structure, the left case 101 and the right case 102 are connected through the connecting portion 12, by mounting the left case 101 and the right case 102 to the head rest frame 10 from the left and the right, respectively.

In addition, the left case 101 and the right case 102 are also coupled with the first coupling pin 50 as described above, and coupled also with the head rest frame 10 and the cushion sheet 120 as described later. In addition, a fall stopper is provided, if necessary. With this structure, the case 100 after assembling has a structure that is not easily separated, for example, even when a strong impact is applied or the like.

1.7 Operation Means

The operation means 110 is configured to forcibly move the lock plate 60 in the unlock direction, to release the lock of the first locked portion 61 with the in-use first locking portions 31a and release the lock of the second locked portion 62 with the second locking portion 32, when the head rest is in the use range, and release the lock of the first locked portion 61 with the storage first locking portion 31b when the head rest is in the stored position. In the head rest according to the first embodiment, the operation means 110 is formed of a bar-shaped portion 111 including a distal end portion provided with a first cam 111a, and a push button 112 provided on the proximal end side of the bar-shaped portion 111. The operation means 110 is attached to an operation means attachment hole 100e provided in a side surface of the case 100, through a cylindrical holder 130. The inside of the cylindrical holder 130 contains an operation means urging spring 140 to press the operation means 110 inserted therein outward (a direction in which the first cam 111a does not act on a first cam contact portion 63 described later).

The operation means 110 operates as illustrated in FIGS. 4A-4D. Specifically, when no operation force is applied to the push button 112 (non-operation state), the lock plate 60 is in a normal position (position in which the first locked portion 61 is locked with the first locking portion 31 (see FIGS. 3A-3C)). By contrast, when operation force is applied to the push button 112 (operation state), the bar-shaped portion 111 is pushed inside, and the first cam 111a pushes up the first cam contact portion 63, to rotate the lock plate 60 in an unlock direction (direction in which locking between the first locked portion 61 and the first locking portion 31 (see FIGS. 3A-3C) is released) about the center line C2 of the second coupling pin 70 serving as the center. Specifically, the first cam 111a serves as a portion functioning as the unlock means together with the first cam contact portion 63.

1.8 Cushion Sheet

As illustrated in FIG. 1, the cushion sheet 120 is bonded to the front surface of the case 100, in a state in which the cushion sheet 120 extends over the left case 101 and the right case 102. This structure provides cushion property to the head rest without foaming urethane or the like as one unitary piece. In addition, this structure further enhances unity of the left case 101 and the right case 102 with the cushion sheet 120. The cushion sheet 120 is covered with a cover (not illustrated), together with the case 100.

1.9 Operation of Head Rest of First Embodiment

The mechanical member of the head rest according to the first embodiment is formed by coupling by welding the horizontal stay portion 22 to the fixing member 30, in the state where the horizontal stay portion 22 of the head rest stay 20 is inserted into the first stay inserting holes 33 of the fixing member 30 and the second stay inserting holes 41 in the rotating member 40. With the structure, the head rest according to the first embodiment not only includes features of both the folding type and the back-and-forth adjustable type, but also has a structure in which the head rest is not rotated forward unless the operation means 110 is operated.

Specifically, as illustrated in FIG. 3A, when the head rest is in the rearmost position (when the forward tilting angle is 0°), the horizontal stay portion 22 of the head rest stay 20 abuts against the front end portion of each second stay inserting hole 41, and backward rotation of the head rest is regulated. When the head rest in the rearmost position is rotated forward, the head rest changes to a state in which the first locking portion 61 of the lock plate 60 is locked with the rearmost in-use first locking portion 31a. When the head rest is rotated further forward from this state, the in-use first locking portion 31a with which the first locked portion 61 is locked is shifted forward one by one, and the head rest reaches the forward adjustment limit position illustrated in FIG. 3B. Specifically, the front-and-rear position of the head rest in use can be adjusted with four stages, including the state of FIG. 3A. The rotating member 40 is continuously urged with the rotating member urging spring 80 described above in a direction (direction of backward rotation) of returning to its initial position (position in FIG. 3A). In addition, because the lock plate 60 is continuously urged in the lock direction with the lock urging spring 90, the first locked portion 61 is securely locked with the in-use first locking portions 31a.

As described above, when the head rest is in the use range (between the rearmost position and the forward adjustment limit position), the horizontal stay portion 22 of the head rest stay 20 abuts against the front end portion of each second stay inserting hole 41, or the first locked portion 61 is locked with the first locking portion 31a, to regulate backward rotation of the head rest, while forward rotation of the head rest is not regulated (the head rest is rotatable forward without operation of the operation means 110). However, when the head rest in the forward adjustment limit position (see FIG. 3B) is to be rotated further forward, the second locked portion 62 of the lock plate 60 is locked with the second locking portion 32. For this reason, when the head rest is in the forward adjustment limit position, the head rest is prevented from rotating forward (the head rest is not moved to the stored position illustrated in FIG. 3C), unless the operation means 110 is operated to rotate the lock plate 60 in the unlock direction. Accordingly, even in abnormal stop or the like, the head rest is not rotated forward more than required, but safely and properly supports the head of the seated person.

When the head rest is not used, the operation means 110 (see FIG. 1) is operated, to detach the first locked portion 61 from the first locking portion 31. In this manner, the head rest is enabled to be moved to the forward stored position, as illustrated in FIG. 3C. When the head rest is in the stored position, because the first locked portion 61 of the lock plate 60 is locked with the storage first locking portion 31b, backward rotation of the head rest is regulated. In addition, forward rotation of the head rest is also regulated, because the horizontal stay portion 22 abuts against the rear end portion of each second stay inserting hole 41. When the head rest is in the stored position and when the head rest is in the use position (excluding the time when the head rest is in the rearmost position), the head rest can be rotated backward by operating the operation means 110.

2. Head Rest of Second Embodiment

The following is explanation of a head rest of the second embodiment. FIGS. 6A-6D include diagrams of side views illustrating a state in which the head rest according to the second embodiment is rotated from a rearmost position (FIG. 6A) to a stored position (FIG. 6D) through a forward adjustment limit position (FIG. 6B) and an unlock position (FIG. 6C). In FIGS. 6A-6D, illustration of some members such as the case 100 (see FIG. 1) is omitted for convenience' sake of illustration. The following explanation illustrates parts that are different from those of the head rest of the first embodiment with attention. The constituent elements similar to those of the head rest of the first embodiment can be adopted for constituent elements that are not specifically referred to in the head rest of the second embodiment.

The head rest according to the second embodiment is of an upward swing adjustment type that includes features of both the folding type and the back-and-forth adjustable type, in the same manner as the head rest of the first embodiment. Like the first embodiment, the head rest of the second embodiment also includes the in-use tilting-angle adjustment means, the in-use forward rotation regulating means, the storage backward rotation regulating means, and the unlock means, and corresponds to the "head rest regulating forward rotation in use" described above. The head rest of the second embodiment is the same as the head rest of the first embodiment, in that the in-use first locking portions 31a in the fixing member 30 and the first locked portion 61 in the lock plate 60 function as the in-use tilting-angle adjustment means, the second locking portion 32 in the fixing member 30 and the second locked portion 62 in the lock plate 60 function as the in-use forward rotation regulating means, the storage first locking portion 31b in the fixing member 30 and the first locked portion 61 in the lock plate 60 function as the storage backward rotation regulating means, and the first cam contact portion 63 in the lock plate 60 and the first cam 111a in the operation means 110 function as the unlock means. However, the head rest of the second embodiment is different from the head rest of the first embodiment in the details of the unlock means. In the head rest of the second embodiment, when the head rest is in the use range, constituent elements other than the first cam contact portion 63 and the first cam 111a also function as the unlock means.

The following is specific explanation the difference. As illustrated in FIGS. 6A-6D, the head rest according to the second embodiment includes a lock regulating member 150 including a second cam 151 and a third stay inserting hole 152 having an arc long hole shape. The lock regulating member 150 is supported in a rotatable state with respect to the first coupling pin 50, in the same manner as the rotating member 40. The horizontal stay portion 22 of the head rest stay 20 is inserted through the third stay inserting hole 152. The lock plate 60 is also provided with a second cam contact portion, in addition to the first locked portion 61 and the first cam contact portion 63.

Figure 6A:
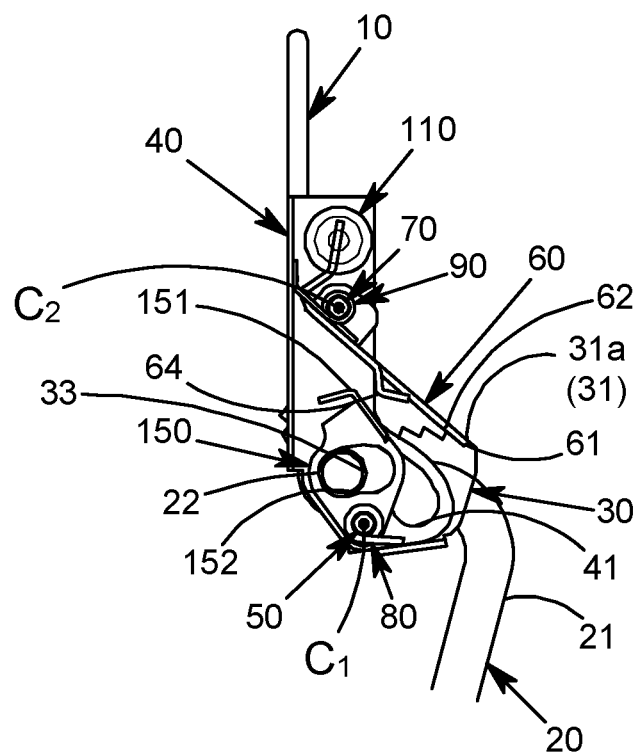
FIGS. 6A-6D include diagrams of side views illustrating a state in which a head rest according to a second embodiment is rotated from a rearmost position (FIG. 6A) to a stored position (FIG. 6D) through a forward adjustment limit position (FIG. 6B) and an unlock position (FIG. 6C)
Figure 6B:
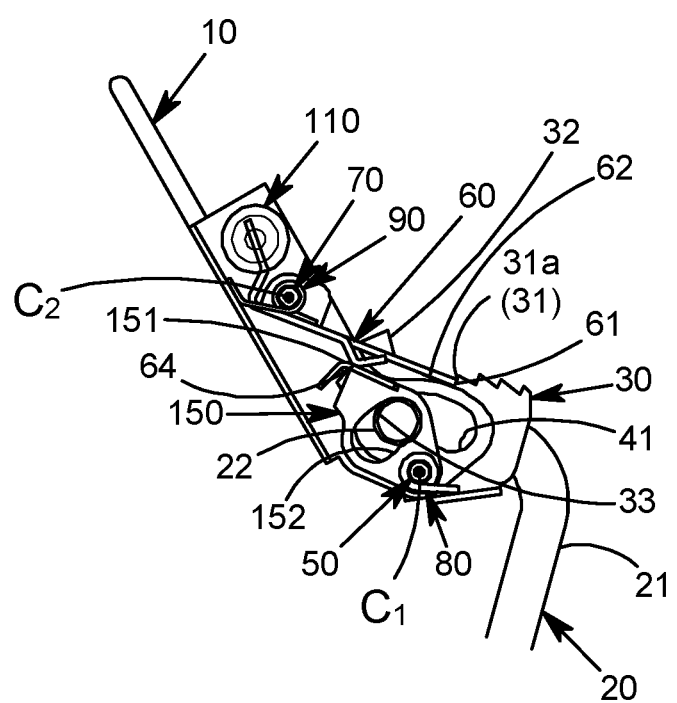
Figure 6C:
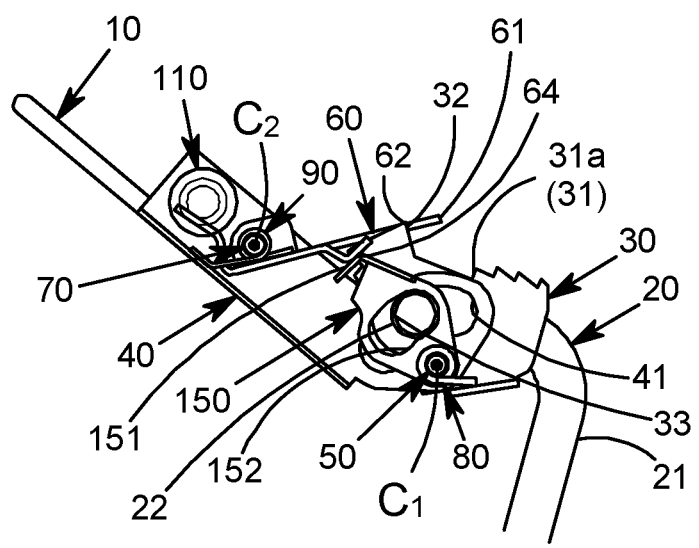

The head rest according to the second embodiment is in a state in which the position of the head rest can be adjusted forward, in the same manner as the head rest of the first embodiment, in a range from the rearmost position illustrated in FIG. 6A to the forward adjustment limit position illustrated in FIG. 6B. The lock regulating member 150 has rotation resistance to the rotating member 40. For this reason, the rock regulating member 150 when the head rest is in the use range is rotated forward together with the rotating member 40. Accordingly, when the head rest is in the use range, like the head rest of the first embodiment, the lock plate 60 is pressed in the lock direction, and the first locked portion 61 is locked with the first locking portion 31, to regulate backward rotation of the head rest. When the head rest is in the rearmost position, because the horizontal stay portion 22 of the head rest stay 20 abuts against the front end portion of each second stay inserting hole 41, backward rotation of the head rest is regulated also with the abutment.

In the head rest according to the second embodiment, when the head rest reaches the forward adjustment limit position as illustrated in FIG. 6B, the horizontal stay portion 22 of the head rest stay abuts against the rear end portion of the third stay inserting hole 152 in the lock regulating member 150, to regulate forward rotation of the lock regulating member 150. For this reason, when the head rest in the forward adjustment limit position is rotated further forward, the lock regulating member 150 stays in the place without moving together with the rotating member 40, and the rotating member 40 is rotated forward, leaving the lock regulating member 150. In addition, in the head rest according to the second embodiment, when the head rest reaches a position close to the forward adjustment limit position, the second cam 151 of the lock regulating member 150 abuts against a second cam contact portion 64 of the lock plate 60. For this reason, after the second cam 151 contacts the second cam contact portion 64, when the head rest is rotated further forward, the first locked portion 61 is detached from the in-use first locking portion 31a, to enable the state in which the head rest is rotated backward to the rearmost position, by action between the second cam 151 and the second cam contact portion 64. In addition, in the head rest of the second embodiment, the first locked portion 61 is detached from the first locking portion 31 to move the head rest to the forward stored position, also by operating the operation means 110 to act the first cam 111a on the first cam contact portion 63. Specifically, in the head rest of the second embodiment, both the second cam 151 and the second cam contact portion 64, and the first cam 111a (FIGS. 4A-4D) of the operation means 110 and the first cam contact portion 63 (FIGS. 4A-4D) of the lock plate 60 function as the unlock means.

Figure 6D:
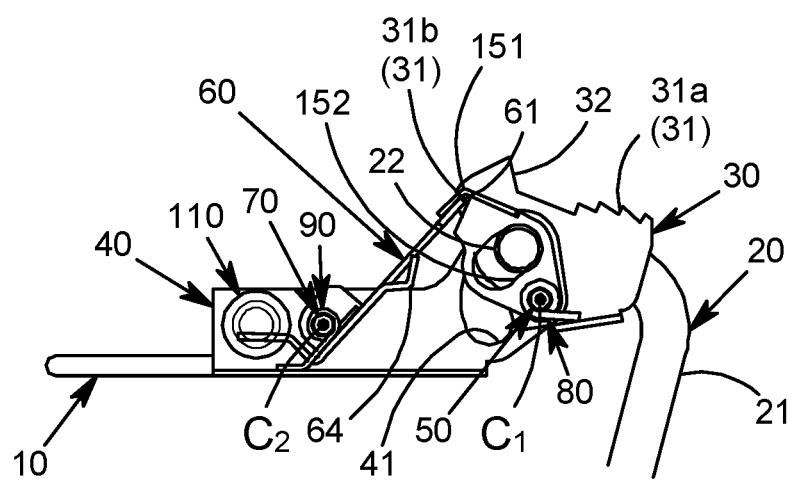

In addition, when the head rest in the forward adjustment limit position is rotated further forward, as illustrated in FIG. 6C, the second locked portion 62 of the lock plate 60 is locked with the second locking portion 32 of the fixing member 30. For this reason, when the head rest is in the forward adjustment limit position, engagement of the second locked portion 62 with the second locking portion 32 is not released, and the head rest is prevented from moving to the stored position illustrated in FIG. 6D, unless the operation means 110 is operated to perform unlocking. Accordingly, even in abnormal stop or the like, the head rest is not rotated forward more than required, but safely and properly supports the head of the seated person. When the head rest is not used, the operation means 110 (see FIG. 1) is operated, to detach the second locked portion 62 from the second locking portion 32, and the head rest is changed to a state of being movable to the forward stored position as illustrated in FIG. 6D. The head rest can also be returned to the rearmost position.

3. Head Rest of Third Embodiment

The following is explanation of a head rest of the third embodiment. FIGS. 7A-7D include diagrams of side views illustrating a state in which the head rest according to the third embodiment is rotated from a rearmost position (FIG. 7A) to an unlock position (FIG. 7D) through a forward adjustment limit position (FIG. 7B) and a stored position (FIG. 7C). In FIGS. 7A-7D, illustration of some members is omitted for convenience' sake of illustration. The following explanation illustrates parts that are different from those of the head rest of the first embodiment or the second embodiment with attention. The constituent elements similar to those of the head rest of the first embodiment or the second embodiment can be adopted for constituent elements that are not specifically referred to in the head rest of the third embodiment.

The head rest according to the third embodiment is of an upward swing adjustment type including features of both the folding type and the back-and-forth adjustable type, in the same manner as the head rests of the first embodiment and the second embodiment. However, the head rest of the third embodiment includes no in-use forward rotation regulating means, but includes the in-use tilting-angle adjustment means, the storage backward rotation regulating means, and the unlock means, and corresponds to the "head rest not regulating forward rotation in use". In addition, each of the head rests of the first embodiment and the second embodiment includes the operation means 110 and includes the first cam contact portion 63 in the lock plate 60 and the first cam 111a in the operation means 110 as the unlock means, but the head rest of the third embodiment includes only the second cam contact portion 64 in the lock plate 60 and the second cam 151 in the lock regulating member 150. Besides, although each of the head rests of the first embodiment and the second embodiment has the structure in which the head rest in the stored position cannot be rotated forward any more, the head rest according to the third embodiment has a structure in which the head rest in the stored position can be rotated further forward to the unlock position beyond the stored position.

This point will be specifically explained hereinafter. The head rest according to the third embodiment includes neither second locking portion 32 nor second locked portion 62 serving as the in-use forward rotation regulating means, and the head rest in the forward adjustment limit position illustrated in FIG. 7B can be rotated forward. For this reason, in the head rest of the third embodiment, the rotating member urging spring 80 preferably has a large urging force to prevent the head rest in the use range from rotating forward to the stored position, in abrupt deceleration or abnormal stop such as collision. In addition, the height of the case 100 is preferably set low, and the distal end portion of the head rest is preferably formed in a round shape, to prevent the distal end portion of the head rest from damaging the seated person, even if the head rest is rotated forward to the stored position.

The head rest according to the third embodiment includes the lock regulating member 150, as illustrated in FIGS.

7A-7D. The lock regulating member 150 is provided with the third stay inserting hole 152 in the same manner as the head rest of the second embodiment. However, the third stay inserting hole 152 in the head rest of the third embodiment is formed in an arc shape longer than that of the third stay inserting hole 152 in the head rest of the second embodiment. For this reason, in the head rest of the third embodiment, when the head rest rotating forward reaches the stored position illustrated in FIG. 7C, the horizontal stay portion 22 of the head rest stay 20 abuts against the rear end portion of the third stay inserting hole 152, and only the rotating member 40 is rotated, leaving the lock regulating member 150, when the head rest is located in a more front position than the stored position, while the head rest of the second embodiment has the structure in which, when the head rest rotating forward is in the forward adjustment limit position, the horizontal stay portion 22 of the head rest stay 20 abuts against the rear end portion of the third stay inserting hole 152, and only the rotating member 40 is rotated forward, leaving the lock regulating member 150 in a position more front than the forward adjustment limit position. Accordingly, the unlock position (FIG. 7D) in which the second cam contact portion 64 acts on the second cam 151 to unlock the lock plate 60 is located in a more front position than the stored position.

Figure 7A:
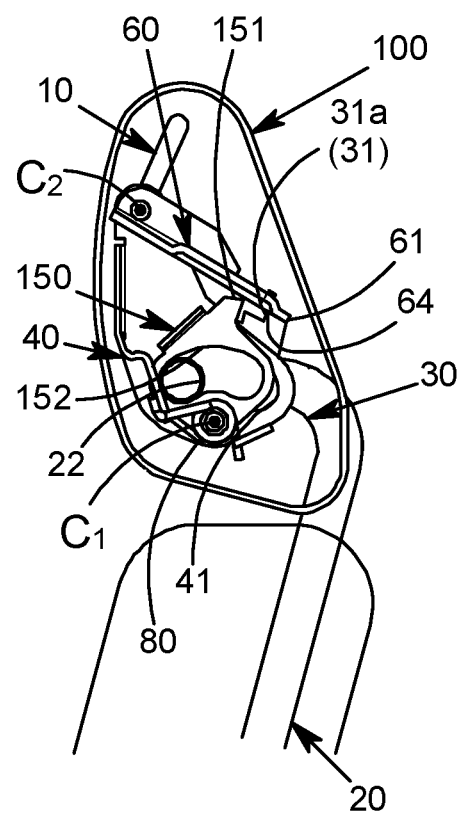
FIGS. 7A-7D include diagrams of side views illustrating a state in which a head rest according to a third embodiment is rotated from a rearmost position (FIG. 7A) to an unlock position (FIG. 7D) through a forward adjustment limit position (FIG. 7B) and a stored position (FIG. 7C).
Figure 7B:
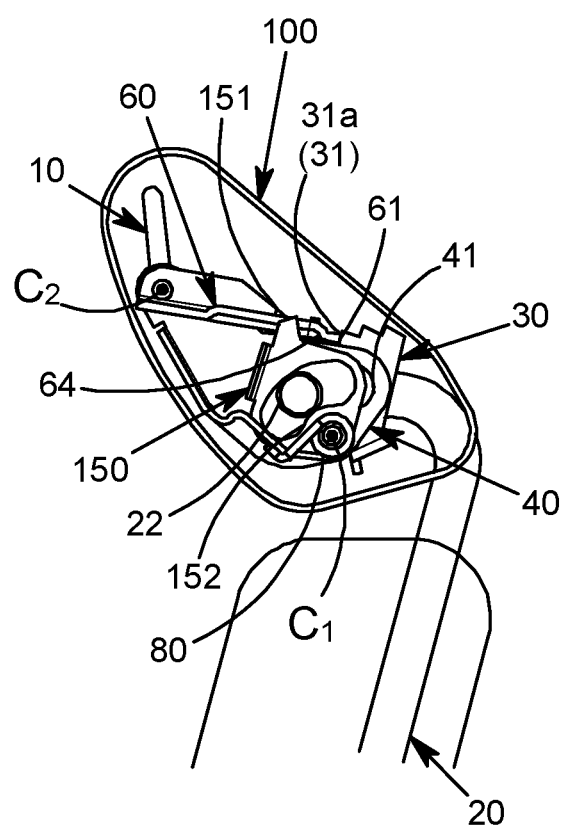
Figure 7C:
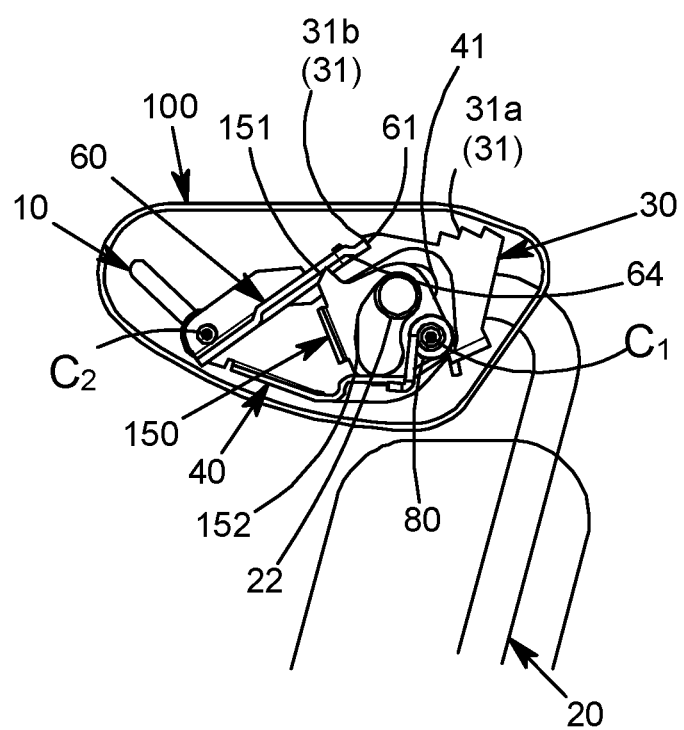
Figure 7D:
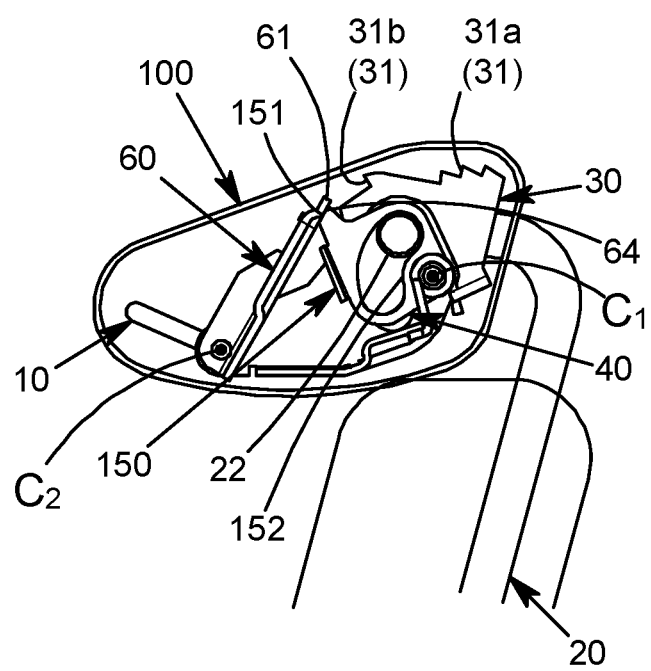

The head rest according to the third embodiment described above includes no operation means 110, and has a structure in which the head rest in the use range or the stored position is once rotated to the unlock position in a more front position than the stored position, to return the head rest to the rearmost position illustrated in FIG. 7A without operation of the operation means 110. Accordingly, the head rest according to the third embodiment requires no complicated operations, although the head rest includes features of both the folding type and the back-and-forth adjustable type.

4. Use

As described above, the head rest of the present disclosure enhances safety and reduces the cost and the weight, as well as including features of both the folding type and the back-and-forth adjustable type, and thus can be suitably adopted as a head rest provided in the upper portion of the seat of transportation means such as automobiles.

As described above, the present disclosure provides a head rest that is tilted down forward to be substantially horizontal when the head rest is not used, to secure the backward view of the driver or the like, and enable adjustment of its front-and-rear position (tilting angle) in an optimum position when the head rest is used. The present disclosure also provides a head rest with excellent safety, reduces the cost by processing the constituent members of the head rest by ordinary press, and reduces the weight by thinning the constituent members of the head rest.

What is claimed is:

1. A head rest of an upward swing adjustment type supported by a head rest stay in a state of being rotatable from a rearmost position to a stored position, the head rest being in rising state at the rearmost position, the head rest being tilted forward by approximately 70° to 90° at the stored position, the head rest comprising:
a unit including
a fixing member to be fixed to the head rest stay,
a rotating member pin-coupled with the fixing member,
a rotating member urging spring continuously urging the rotating member in a direction returning to a rearmost position,
a lock plate pin-coupled with the rotating member,
a lock urging member continuously urging a lock plate in a regulating direction, and
a lock regulating member pin-coupled with the fixing member;
a mechanical member in which the unit and the head rest stay are coupled;
a case enveloping the mechanical member; and
a cushion material and a cover covering the case, wherein
an in-use first locking portion provided in an external circumferential portion of the fixing member and an in-use first locked portion provided in the lock plate function as the in-use tilting-angle adjustment member,
a second cam provided in the lock regulating member and a second cam contact portion provided in the lock plate function as the unlock means,
a storage first locking portion provided in the lock plate and the in-use first locked portion function as in-storage backward rotation regulating means,
if the head rest is in a use range, the use range is between the rear most position and a forward adjustment limit position, the head rest tilting forward by approximately 40° from the rearmost position to reach the forward adjustment limit position,
a tilting angle of the head rest is adjustable by the in-use tilting-angle adjustment means, and the head rest is enabled to be rotated forward to the stored position and rotated backward to the rearmost position by the unlock means, and
if the head rest is in the stored position, the head rest in the stored position is enabled to be rotated backward to the rearmost position by the unlock means, while backward rotation of the head rest is regulated by the in-storage backward rotation regulating means.

2. A head rest of an upward swing adjustment type supported by a head rest stay in a state of being rotatable from a rearmost position to a stored position, the head rest being in rising state at the rearmost position, the head rest being tilted forward by approximately 70° to 90° at the stored position, the head rest comprising:
a unit including
a fixing member to be fixed to the head rest stay,
a rotating member pin-coupled with the fixing member,
a rotating member urging spring continuously urging the rotating member in a direction returning to a rearmost position,
a lock plate pin-coupled with the rotating member, and
a lock urging spring continuously urging a lock plate in a regulating direction;
a mechanical member in which the unit and the head rest stay are coupled;
a case enveloping the mechanical member;
an operation member incorporated in the case; and
a cushion material and a cover covering the case, wherein
an in-use first locking portion provided in an external circumferential portion of the fixing member and an in-use first locked portion provided in the lock plate function as in-use tilting-angle adjustment means,
a second locking portion provided in the external circumferential portion of the fixing member and a second locked portion provided in the lock plate function as an in-use forward rotation regulating member,
a first cam provided in the operation member and a first cam contact portion provided in the lock plate, or a second cam provided in a lock regulating member pin-coupled with the fixing member and a second cam contact portion provided in the lock plate function as unlock means, a storage first locking portion provided in the lock plate and the in-use first locked portion function as in-storage backward rotation regulating means, if the head rest is in a use range, the use range is between the rear most position and a forward adjustment limit position, the head rest tilting forward by approximately 40° from the rearmost position to reach the forward adjustment limit position, a tilting angle of the head rest is adjustable by the in-use tilting-angle adjustment means, and the head rest is enabled to be rotated forward to the stored position and rotated backward to the rearmost position by the unlock means, and if the head rest is in the stored position, the head rest in the stored position is enabled to be rotated backward to the rearmost position by the unlock means, while backward rotation of the head rest is regulated by the in-storage backward rotation regulating means.

* * * * *

UNITED STATES PATENT AND TRADEMARK OFFICE
CERTIFICATE OF CORRECTION

PATENT NO. : 9,862,294 B2
APPLICATION NO. : 15/383242
DATED : January 9, 2018
INVENTOR(S) : Takeshi Yamane Page 1 of 1

It is certified that error appears in the above-identified patent and that said Letters Patent is hereby corrected as shown below:

In the Specification

At Column 6, Line 59: please delete "a pitch a" and replace it with --a pitch α--

Signed and Sealed this
Eighth Day of May, 2018

Andrei Iancu
*Director of the United States Patent and Trademark Office*